Patented Sept. 10, 1929.

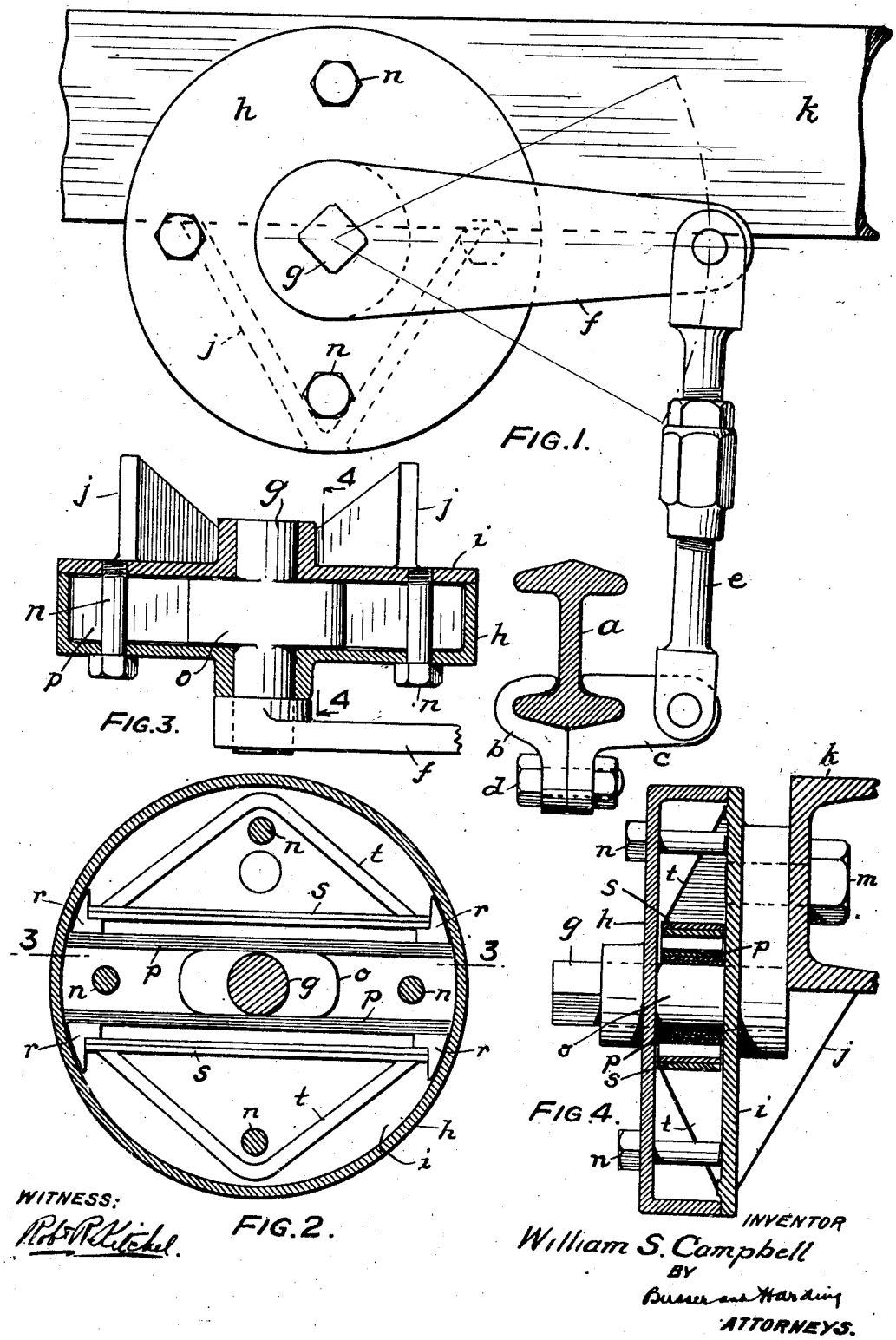

1,727,746

UNITED STATES PATENT OFFICE.

WILLIAM S. CAMPBELL, OF NEWARK, DELAWARE.

SHOCK ABSORBER OR STABILIZER FOR MOTOR-DRIVEN VEHICLES.

Application filed January 17, 1925. Serial No. 2,995.

The object of my invention is to provide a shock absorber or stabilizer for motor driven vehicles which will operate to minimize the vibrations arising from the travel of the vehicle over a rough roadway or elevations or depressions in any roadway. Such vehicles comprise axles and a frame, chassis or body supported thereon by means of springs which, in the passage of the wheels over an irregular surface, will more or less cushion the shock that would otherwise be transmitted to the frame. The supporting springs will not, however, instantly return to their normal (at rest) condition, but will flex back and forth and transmit a multiple vibratory movement to the frame with more or less shock on each return movement of the springs toward normal position. It is advisable therefore to minimize this secondary vibratory movement and to restore the springs to normal condition with the least possible shock.

To this end I have devised a shock absorber or stabilizer, one preferred embodiment of which is shown in the accompanying drawings, in which—

Fig. 1 is a side view of a part of the frame (chassis or body), the casing in which the stabilizing contrivance is enclosed, and the connections from such contrivance to the axle.

Fig. 2 is a longitudinal section through said casing.

Fig. 3 is a section on the line 3—3 of Fig. 2.

Fig. 4 is a section on the line 4—4 of Fig. 3.

Clamps $b$ and $c$ are secured to the axle $a$ by means of a bolt $d$ engaging abutting flanges on the clamps. One of the clamps forms an arm to which is pivoted the lower end of a rod $e$, whose upper end is pivoted to an arm $f$ secured to a shaft $g$. Shaft $g$ projects into a casing composed of a base plate $i$ and a cover plate $h$. Base plate $i$ is provided with a web $j$ which engages the vehicle frame $k$, the plate secured to the frame by means of a bolt $m$. Cover plate $h$ is secured to base plate $i$ by means of bolts $n$.

Shaft $g$, which projects through casing $h, i$, and turns in bearings therein, carries a cam $o$ within the casing. The upper and lower sides of the cam are flat. The ends are convexly curved and merge into the flat sides; the curve uniting the ends and sides being on radii shorter than the distance from such curved surface to the center of the shaft. Applied to opposite flat faces of the cam $o$ are leaf springs $p, p$, each of which comprises a number of flat flexible and elastic leaves extending substantially entirely across the casing. The ends of springs $p, p$ are held from moving outward in a direction perpendicular to their direction of extension by means of members $r$, which are shouldered to provide seats for the ends of springs $s, s$. Each of the latter springs comprises (preferably) a plurality of flexible and elastic leaves extending parallel to springs $p, p$, but spaced therefrom by seats $r$; springs $s$ being heavier, or less flexible and elastic, than springs $p$. Webs $t$ on the casing hold the ends of springs $s$ on their seats.

In the event of any vertical movement of frame $k$ relative to axle $a$, shaft $g$ (by reason of its connections $f, e$ and $d$ with the axle), turns on its axis, causing cam $o$ to turn from the normal position shown in Fig. 2 and throw springs $p, p$ into tension. The more the springs $p, p$ are distorted from their normal flat condition, the greater their resistance. Their resistance finally becomes strong enough to oppose further movement of the cam and then (as the force tending to turn the cam diminishes or ceases) to restore the cam to normal position. The cam, by reason of the momentum acquired on its return movement, may ride somewhat beyond the center and cause a minor secondary expansion of the springs; but it is obvious that the action of the cam is a "snubbing" action and that the springs tend to be speedily restored to their normal flat condition. Consequently the secondary up and down vibrations of the vehicle frame on the axle are minimized and the shock of the original impact absorbed speedily and with the least possible strain on the axle and frame and with the least possible discomfort to passengers.

It is intended that vibrations of lesser strength or amplitude shall be absorbed by the springs $p, p$ and the regular vehicle springs. However, in the case of vibrations of major strength or amplitude, the springs $p, p$ will be distorted to such degree that they will engage and flex the springs $s, s$, which, however, are more resistant and therefore oppose a more nearly unyielding force to the further turning of shaft $g$ and therefore act, cooperatively with springs $p, p$, to quickly reverse the turning movement of the shaft and its restoration to its normal position.

Having now fully described my invention, what I claim and desire to protect by Letters Patent is:

1. A shock absorber or stabilizer for motor driven vehicles, comprising a supporting element, a shaft journaled in the supporting element, a cam on the shaft, leaf springs on opposite sides of the cam, auxiliary springs spaced from said leaf springs, means on the supporting element for holding the leaf springs in contact with the cam, a lever connected to the shaft, means for fixedly connecting the supporting element to the frame of a vehicle; and means for pivotally connecting the free end of the lever to the axle of the vehicle.

2. A shock absorber or stabilizer for motor driven vehicles, comprising a casing, a shaft journaled in the casing, a cam on said shaft, a leaf spring on each side of the cam, a second spring adjacent to, but spaced from each of the first springs and arranged to be brought into action after the first springs have been flexed to a predetermined extent by the cam, means in the casing for supporting the springs, a lever connected to the shaft, means for fixedly connecting the casing to the frame of a vehicle, a link connected to the free end of the lever, the other end of the link being arranged to be pivotally connected to the axle of the vehicle.

3. A shock absorber or stabilizer for motor driven vehicles comprising a casing, a shaft journaled in the casing, a cam on said shaft, a leaf spring on each side of the cam, a second leaf spring adjacent to each of the first springs, abutments in the casing for the ends of each of the last mentioned springs, spacers between the ends of each of the last mentioned springs and the ends of each of the first mentioned springs adjacent thereto, the arrangement being such that the second springs are not brought into action until after the first springs have been flexed to a predetermined degree by the cam, a lever connected to the shaft, and means for connecting the casing and free end of the lever to the frame and axle of a vehicle.

4. In a shock absorber or stabilizer for motor driven vehicles, the combination with the frame and axle of the vehicle, of a shaft, means between the axle and shaft to effect turning of the latter in the movement of the frame relative to the axle, springs on opposite sides of the shaft, means to support said springs from the frame, a cam on the shaft adapted to actuate said springs to throw them into tension in the turning of the shaft in either direction from its normal position of rest, and other relatively heavy springs adapted, under heavy vibrations, to be thrown into tension by the other and lighter springs and cooperate with them to restore the shaft to normal position and minimize secondary vibrations.

5. In a shock absorber or stabilizer for motor driven vehicles, the combination with the frame and axle of the vehicle, of a shaft, means between the axle and shaft to effect turning of the latter in the movement of the frame relative to the axle, springs on opposite sides of the shaft, means to support said springs from the frame, a cam on the shaft adapted to actuate said springs to throw them into tension in the turning of the shaft in either direction from its normal position of rest, and other relatively heavy springs adapted, when the other and lighter springs are thrown into tension beyond a predetermined degree, to be also thrown into tension and supplement the action of the lighter springs in the restoration of the shaft to normal position.

6. In a shock absorber or stabilizer for motor driven vehicles, the combination with the frame and axle of the vehicle, of a shaft, means between the axle and shaft to effect turning of the latter in the movement of the frame relative to the axle, a cam on the shaft, a casing secured to the frame, two relatively light leaf spring structures carried by the casing and positioned on opposite sides of the cam, and two relatively heavy leaf spring structures carried by the casing and between which and the shaft the relatively light leaf spring structures are respectively positioned, the lighter leaf spring structures, in the movement of the frame relative to the axle, being thrown into tension by the cam and thereby acting as snubbers and adapted, under heavy vibrations, to engage and throw into tension the relatively heavy leaf spring structures, which then act as more powerful snubbers.

7. In a shock absorber or stabilizer for motor driven vehicles, the combination with the frame and axle of the vehicle, of a shaft, means between the axle and shaft to effect turning of the latter in the movement of the frame relative to the axle, springs on opposite sides of the shaft, means to support said springs from the frame, a cam on the shaft adapted to actuate said springs to throw them into tension in the turning of the shaft in either direction from its normal position of rest, and other relatively heavy springs also supported from the frame and adapted, under heavy vibrations, to be thrown into tension by the other and lighter springs, said springs being of leaf form and their supporting means comprising a casing secured to the frame, seats supporting the ends of the heavier springs and also restraining the ends of the lighter springs from displacement, and webs on the casing holding the ends of the heavier springs on their seats.

In testimony of which invention, I have hereunto set my hand, at Newark, Del., on this tenth day of January, 1925.

WILLIAM S. CAMPBELL.